July 26, 1927.                E. THOMSON                1,637,063
ELECTRIC WELDING
Filed Oct. 25, 1924

Inventor,
Elihu Thomson,
by
His Attorney.

Patented July 26, 1927.

1,637,063

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTRIC WELDING.

Application filed October 25, 1924. Serial No. 745,890.

My invention relates to electric resistance line or seam welding, and has for its object the provision of an improved arrangement for uniting metal parts by a seam weld without buckling or overheating of the metal.

In uniting metal parts by a seam weld with pressure continuously applied between roller electrodes, difficulty is encounted due to the fact that the heated metal tends to flow ahead of the electrodes and form irregularities or defects in the weld. It has been proposed to avoid this difficulty by rapidly making and breaking the primary circuit of the transformer through which current for welding is supplied and at the same time exerting pressure between the electrodes as the parts to be united are progressively moved therebetween. This method of operation is advantageous in that it permits intermittent cooling of the metal in a manner to prevent it from flowing ahead of the electrodes and forming irregularities or defects in the weld. The same result may be attained without interruption of the circuit by alternately reducing and increasing the value of the welding current by changing the impedance of the welding circuit. In accordance with my invention, this result is accomplished by means of a movable core member associated with the secondary circuit in a manner to control by its position the amount of current supplied to the weld. As hereinafter set forth, this movable core member may be arranged either to move in and out of the secondary circuit or to move in and out of a reactor connected in shunt to the secondary circuit.

My invention will be better understood from the following description when considered in connection with the accompanying drawing and its scope will be pointed out in the appended claims.

Figure 1:
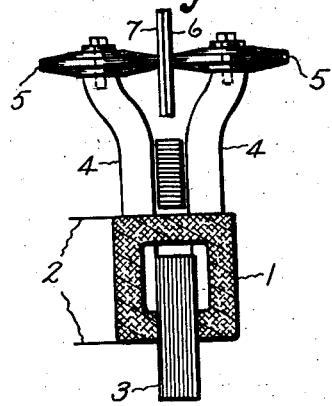
Figure 2:
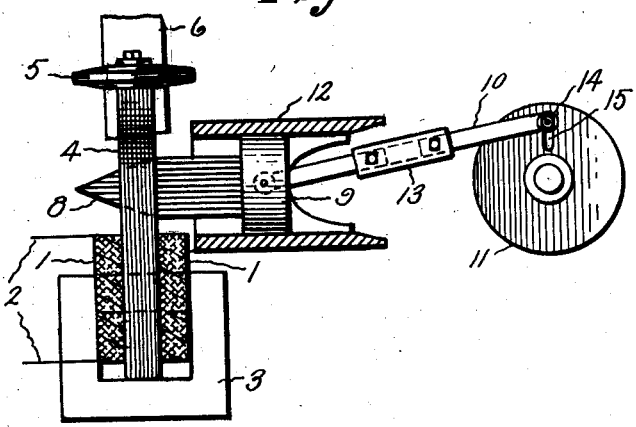
Figure 3:
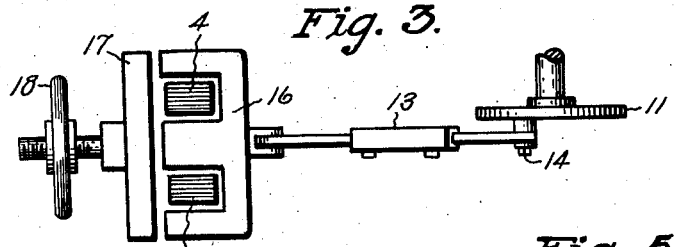
Figure 4:
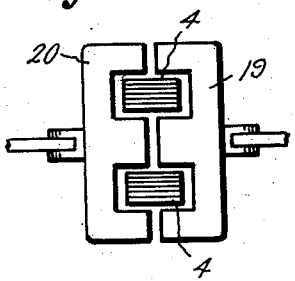
Figure 5:
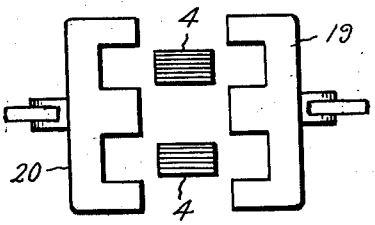
Figure 6:
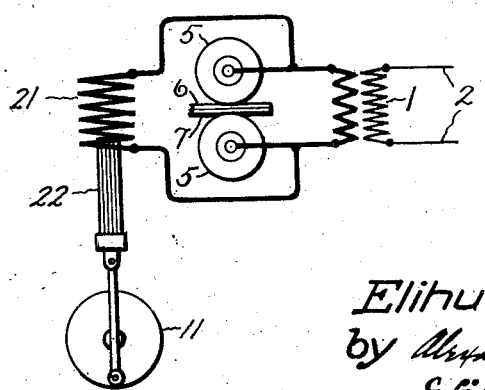

Referring to the drawing, Figs. 1 and 2 show different views of an arrangement wherein an irregularly shaped laminated core member is arranged to be moved to and fro between the legs of the secondary circuit for the purpose of controlling its reactance; Fig. 3 shows a modification wherein the movable core member is arranged partially to surround the legs of the secondary circuit and to cooperate with an adjustable yoke member; Figs. 4 and 5 show different views of a further modification wherein two movable yoke members are arranged to vary the reactance of the secondary circuit; and Fig. 6 shows a modification differing from those illustrated by the previous figures in that the movable core is arranged to cooperate with a reactance coil connected in shunt to the secondary circuit.

Figs. 1 and 2 show a welding transformer comprising a primary coil 1 arranged to be supplied with current through leads 2. This transformer also comprises a core 3, and a secondary circuit the legs 4 of which lead current to the roller electrodes 5. The work to be welded is represented by a pair of plates 6 and 7 interposed between the electrodes 5. Suitable means, examples of which are well known in the art, are provided for pressing the electrodes against the work and producing relative movement between the electrodes and the work along the line of the weld. A laminated core member 8 is arranged to be reciprocated by suitable means indicated as a cross-head 9, rod 10 and crank wheel 11 for the purpose of increasing and decreasing the reactance of the secondary circuit of the transformer to change the current alternately from a welding to a non-welding value, thus affording welding intervals and cooling intervals. The cross-head 9 is shown as moving in a guide 12 and a collar 13 is provided for adjusting the travel of the cross-head 9 and core member 8. The amount of this travel may be further adjusted, if desired, by movement of the pin 14 along the radial slot 15. The wheel 11 may be driven at the proper speed to give the desired intermittency to the welding current.

It will be observed that the reactance of the secondary circuit, and consequently the value of the current supplied to the weld, is at any instant dependent on the shape of the core member and the position of this member with respect to the welding circuit. It is therefore possible to predetermine the character of the changes in the welding current by the design and speed of the movable core. In the drawing this core member has been shown as formed in the shape of a wedge. It will be apparent, however, that its form and the design of its driving means will in each case be determined somewhat by the character of the work.

In cases where intermittent variations of the current is not desired, the core 8 may be fixed in any desired position of adjustment and the welding current may thus be adjusted to values suitable for welding metal parts of different sizes.

In the arrangement illustrated the crank pin which operates the cross-head 9 has a circular movement but if desired an irregular or elliptical movement may be provided where it is desired to make the duration of the welding intervals differ by any desired amount from the cooling intervals.

Fig. 3 shows a movable core member 16 which, like the core member 8, is arranged to be moved with respect to the secondary circuit for the purpose of intermittently changing the value of the welding current. A yoke member 17 arranged to be adjusted with respect to the secondary circuit by means of a hand wheel 18 is associated with the yoke member 16 for adjusting the magnitude of the changes produced in the welding circuit by movement of the core member 16.

Figs. 4 and 5 show a modification of the invention in which the core members 16 and 17 of Fig. 3 are replaced by movable core members 19 and 20. It will be observed that movement of the core members in opposite directions makes it possible to produce very rapid changes in the value of the welding current and that these changes are of very considerable magnitude due to the fact that the movable core members are arranged completely to surround the legs of the secondary circuit at one instant of their travel.

Fig. 6 shows a reactance coil 21 connected in shunt to the secondary circuit and provided with a movable core 22 arranged to be moved to and fro by rotation of the crank wheel 11. This arrangement has its greatest utility in connection with a welding transformer having a high degree of magnetic leakage. In such case the secondary current tends to assume a constant value and variations of the shunt circuit reactance vary the current supplied to effect the weld.

What I claim as new and desire to secure by Letters Patent of the United States, is:—

1. A line welding machine wherein a pair of electrodes connected to the secondary circuit of a welding transformer are arranged to bear against opposite sides of the work and to conduct welding current therethrough and wherein means are provided for producing relative movement between said work and electrodes along the line of the weld characterized by the fact that means including a movable core member are associated with said secondary circuit to vary the value of said current intermittently between a welding and non-welding value.

2. A welding machine comprising a welding transformer having a secondary provided with a pair of projecting leg members, a pair of electrodes respectively connected to said leg members arranged to bear against opposite sides of the work and to conduct welding current therethrough and means comprising a core movable between the secondary projecting leg members of said transformer to control the reactance of the welding circuit.

3. A line welding machine wherein a pair of electrodes connected to the secondary circuit of a welding transformer are arranged to bear against opposite sides of the work and to conduct welding current therethrough and wherein means are provided for producing relative movement between said work and electrodes along the line of the weld comprising a core member movably related to said secondary circuit and means for reciprocating said core to change said current intermittently between a welding and non-welding value.

4. A welding machine comprising a welding transformer having a secondary provided with a pair of projecting leg members, a pair of electrodes respectively connected to said leg members arranged to bear against the work and to transmit welding current therethrough, means for producing relative movement between said work and at least one of said electrodes along the line of the weld, a core movable between said projecting leg members, and means for adjusting the position of said core to predetermine the value of said current.

In witness whereof, I have hereunto set my hand this 22nd day of October, 1924.

ELIHU THOMSON.